(12) United States Patent
Tomita et al.

(10) Patent No.: US 11,057,201 B2
(45) Date of Patent: Jul. 6, 2021

(54) RANDOM NUMBER SEQUENCE GENERATION APPARATUS, QUANTUM ENCRYPTION TRANSMITTER, AND QUANTUM ENCRYPTION COMMUNICATION SYSTEM

(71) Applicant: NATIONAL UNIVERSITY CORPORATION HOKKAIDO UNIVERSITY, Sapporo (JP)

(72) Inventors: Akihisa Tomita, Sapporo (JP); Kensuke Nakata, Sapporo (JP)

(73) Assignee: NATIONAL UNIVERSITY CORPORATION HOKKAIDO UNIVERSITY, Sapporo (JP)

( * ) Notice: Subject to any disclaimer, the term of this patent is extended or adjusted under 35 U.S.C. 154(b) by 366 days.

(21) Appl. No.: 16/074,856

(22) PCT Filed: Feb. 3, 2017

(86) PCT No.: PCT/JP2017/004081
§ 371 (c)(1),
(2) Date: Aug. 2, 2018

(87) PCT Pub. No.: WO2017/135444
PCT Pub. Date: Aug. 10, 2017

(65) Prior Publication Data
US 2019/0044713 A1    Feb. 7, 2019

(30) Foreign Application Priority Data

Feb. 4, 2016   (JP) .............................. JP2016-019552

(51) Int. Cl.
*H04L 9/08*        (2006.01)
*G06F 7/58*        (2006.01)
*G02F 1/21*        (2006.01)
*H04B 10/70*       (2013.01)
*H04B 10/85*       (2013.01)
*G09C 1/00*        (2006.01)
*H01S 5/0683*      (2006.01)

(52) U.S. Cl.
CPC .............. *H04L 9/0858* (2013.01); *G06F 7/58* (2013.01); *G06F 7/588* (2013.01); *G09C 1/00* (2013.01);
(Continued)

(58) Field of Classification Search
CPC .... H04L 9/0858; H04L 9/0852; H04L 9/0855
See application file for complete search history.

(56) References Cited

U.S. PATENT DOCUMENTS

2008/0052577 A1*   2/2008   Tanaka ................. H04L 9/0852
                                                          714/728
2009/0316901 A1    12/2009  Hayashi
(Continued)

FOREIGN PATENT DOCUMENTS

CN       1396518 A        2/2003
CN       102508634 A      6/2012
(Continued)

OTHER PUBLICATIONS

International Search Report of PCT/JP2017/004081 dated May 9, 2017.
(Continued)

*Primary Examiner* — Farid Homayounmehr
*Assistant Examiner* — Suman Debnath
(74) *Attorney, Agent, or Firm* — Sughrue Mion, PLLC

(57) ABSTRACT

A random number sequence generation apparatus includes: a semiconductor laser device repeatedly generating a pulsed laser beam having a disordered phase; an interferometer including a first transmission line and a second transmission line, a first port connected to an input terminal side and to which the pulsed laser beam is input, a second port connected to an output terminal side and outputs the pulsed laser beam, and a third port connected to the input terminal side; a Faraday mirror connected to the second port and reflecting (Continued)

the pulsed laser beam; a photodiode connected to the third port and outputs an electrical signal in accordance with interference light of the pulsed laser beam that is reflected by the Faraday mirror and passes through one of the transmission lines; and an AD converter configured to generate a random number sequence on the basis of the electrical signal and a threshold.

8 Claims, 7 Drawing Sheets

(52) U.S. Cl.
CPC ......... *H01S 5/06835* (2013.01); *H04B 10/70* (2013.01); *H04B 10/85* (2013.01); *H04L 9/0869* (2013.01); *G02F 1/21* (2013.01)

(56) References Cited

U.S. PATENT DOCUMENTS

| | | | | |
|---|---|---|---|---|
| 2012/0045053 A1* | 2/2012 | Qi | ........................... | G06F 7/588 380/252 |
| 2013/0036145 A1 | 2/2013 | Pruneri et al. | | |
| 2015/0331672 A1* | 11/2015 | Yuan | ........................ | H01S 5/065 359/107 |
| 2016/0047643 A1* | 2/2016 | Yuan | ..................... | H01S 5/4006 398/25 |
| 2017/0010865 A1* | 1/2017 | Sanguinetti | ........... | H04L 9/0852 |

FOREIGN PATENT DOCUMENTS

| | | |
|---|---|---|
| CN | 103793198 A | 5/2014 |
| CN | 105022606 A | 11/2015 |
| EP | 1 522 166 B1 | 2/2008 |
| JP | 2010-233123 A | 10/2010 |
| JP | 2016-006629 A | 1/2016 |
| WO | 2004/073228 A2 | 8/2004 |
| WO | 2009/157756 A3 | 12/2009 |

OTHER PUBLICATIONS

International Preliminary Report on Patentability and Translation of Written Opinion, dated Aug. 16, 2018 from the International Bureau in counterpart International application No. PCT/JP2017/004081.

* cited by examiner

RANDOM NUMBER SEQUENCE GENERATION APPARATUS, QUANTUM ENCRYPTION TRANSMITTER, AND QUANTUM ENCRYPTION COMMUNICATION SYSTEM

CROSS REFERENCE TO RELATED APPLICATIONS

This application is a National Stage of International Application No. PCT/JP2017/004081 filed Feb. 3, 2017, claiming priority based on Japanese Patent Application No. 2016-019552 filed Feb. 4, 2016.

TECHNICAL FIELD

One embodiment of the present invention relates to a random number sequence generation apparatus, a quantum encryption transmitter, and a quantum encryption communication system.

BACKGROUND ART

Conventionally, quantum encryption communication systems for securely transmitting information in an information-theoretically secure manner are known. In a quantum encryption communication system, a sender of information transmits an encryption key through quantum key distribution (QKD) using photons to a receiver. Accordingly, the sender and the receiver can share information relating to an encryption key without this being acquired (wiretapped) by a third party. The sender encrypts information to be transmitted to the receiver using the encryption key. Then, the sender transmits the encrypted information to the receiver using an arbitrary communication means. The receiver decrypts the encrypted information using the encryption key.

The encryption key is acquired on the basis of a random number sequence. As such a random number sequence, it is necessary to use a physical random number that cannot be predicted information-theoretically, and a pseudo random number generated on the basis of an algorithm cannot be used. In addition, in order to respond to an increase in the speed of information communication, there are cases in which a generation speed of several Gb/s or more is required for a random number sequence.

In quantum key distribution, when a third party wiretaps information relating to an encryption key from photons, the quantum state of the photons changes on the basis of the uncertainty principle, and a trace of the wiretapping remains. For this reason, the sender and the receiver can reliably detect wiretapping. As a quantum encryption communication system capable of executing such quantum key distribution, for example, in Patent Literature 1, a system including a quantum encryption transmitter that includes a semiconductor laser device, an interferometer, and a random number source is described.

CITATION LIST

Patent Literature

[Patent Literature 1] Japanese Unexamined Patent Publication No. 2010-233123

SUMMARY OF INVENTION

Technical Problem

However, in the quantum encryption communication system described in Patent Literature 1, in addition to the semiconductor laser device, an interferometer, and the like used for executing the quantum key distribution, and the random number source used for generating a random number sequence are independently disposed. Here, in a random number source capable of generating a physical random number that cannot be predicted information-theoretically and capable of generating a random number sequence, for example, at a generation speed of several Gb/s or more, there are cases in which the device configuration becomes complicated. In a case in which such a random number source is used, the device configuration of the entire quantum encryption communication system becomes complicated.

One embodiment of the present invention was made in view of the problems described above, and an object thereof is to provide a random number sequence generation apparatus, a quantum encryption transmitter, and a quantum encryption communication system capable of generating a random number sequence, which is secured information-theoretically, at a high speed using a simple configuration.

Solution to Problem

In order to solve the problems described above, according to one embodiment of the present invention, there is provided a random number sequence generation apparatus including a semiconductor laser device repeatedly generating a pulsed laser beam having a disordered phase for each pulse through pulse oscillation; an interferometer including a first transmission line and a second transmission line that have mutually-different transmission line lengths, a first port connected to an input terminal side of the first transmission line and the second transmission line and to which the pulsed laser beam is input, a second port that is connected to an output terminal side of the first transmission line and the second transmission line and outputs the pulsed laser beam that is input to the first port and passes through the first transmission line or the second transmission line, and a third port that is connected to the input terminal side; a light reflecting unit connected to the second port and inputting the pulsed laser beam output from the second port to the second port again by reflecting the pulsed laser beam; a photodiode connected to the third port, to which interference light of the pulsed laser beam that is input to the second port by the light reflecting unit and passes through the first transmission line or the second transmission line is input, and outputting an electrical signal in accordance with the input of the interference light; and an AD converter configured to generate a random number sequence on the basis of a magnitude relationship between a signal intensity of the electrical signal and a threshold set in advance.

In such a random number sequence generation apparatus, a pulsed laser beam is transmitted from the first port to the first transmission line or the second transmission line to reach the second port and is reflected by the light reflecting unit, and then is transmitted from the second port to the first transmission line or the second transmission line to reach the third port. The first transmission line and the second transmission line have mutually-different transmission line lengths. For this reason, when the pulsed laser beams are transmitted from the first port to the second port of the interferometer and are transmitted from the second port to the third port, one pulse is split into two pulses (double pulses) with coherence maintained. Out of two pulses forming the double pulses, a pulse transmitted through one transmission line having a longer transmission line length is delayed in reaching a port of a destination than a pulse transmitted through the second transmission line. For this reason, by appropriately setting a difference between the transmission line lengths of the first transmission line and the second transmission line, pulses split from two pulsed laser beams generated at mutually-different timings by the semiconductor laser device reach the third port at almost the same time and interfere with each other at the third port to generate interference light. Here, since the pulsed laser beams have a disordered phase for each pulse, the light intensity of an interference peak of the interference light has a disordered value. When this interference light is input to the photodiode, the photodiode outputs an electrical signal having a disordered signal intensity of a peak corresponding to the interference peak. When this electrical signal is input to the AD converter, the AD converter outputs a binarized random number sequence on the basis of a magnitude relationship between the signal intensity of the peak of the electrical signal and the threshold set in advance. Accordingly, by employing a simple configuration, a random number sequence that is secured information-theoretically can be generated at a high speed.

According to one embodiment of the present invention, there is provided a quantum encryption transmitter including the random number sequence generation apparatus described above, in which the interferometer may further include a fourth port that is connected to the output terminal side and outputs the pulsed laser beam that is input to the first port and passes through the first transmission line or the second transmission line, and a modulation unit that modulates a light intensity and a phase of the pulsed laser beam output from the fourth port on the basis of the random number sequence stored in the random number sequence storing unit may be included. In such a case, the semiconductor laser device and the interferometer included in the quantum encryption transmitter are used also as the semiconductor laser device and the interferometer of the random number sequence generation apparatus, and accordingly, the configuration can be simplified.

According to one embodiment of the present invention, there is provided a quantum encryption communication system that may include: the quantum encryption transmitter described above; and a quantum encryption receiver executing quantum communication of the pulsed laser beam of which the light intensity and the phase are modulated by the modulation unit with the quantum encryption transmitter. In such a case, the semiconductor laser device and the interferometer included in the quantum encryption transmitter are used also as the semiconductor laser device and the interferometer of the random number sequence generation apparatus, and accordingly, the configuration can be simplified.

Advantageous Effects of Invention

According to one embodiment of the present invention, a random number sequence generation apparatus, a quantum encryption transmitter, and a quantum encryption communication system capable of generating a random number sequence, which is secured information-theoretically, at a high speed using a simple configuration can be provided.

DESCRIPTION OF EMBODIMENTS

Hereinafter, a random number sequence generation apparatus, a quantum encryption transmitter, and a quantum encryption communication system according to preferred embodiments of the present invention will be described in detail with reference to the drawings. In description of the drawings, the same reference signs will be assigned to the same elements, and duplicate description thereof will not be presented.

[Premise Configuration]

First, the configuration of a quantum encryption communication system that is a premise of this embodiment will be described.

Figure 6:
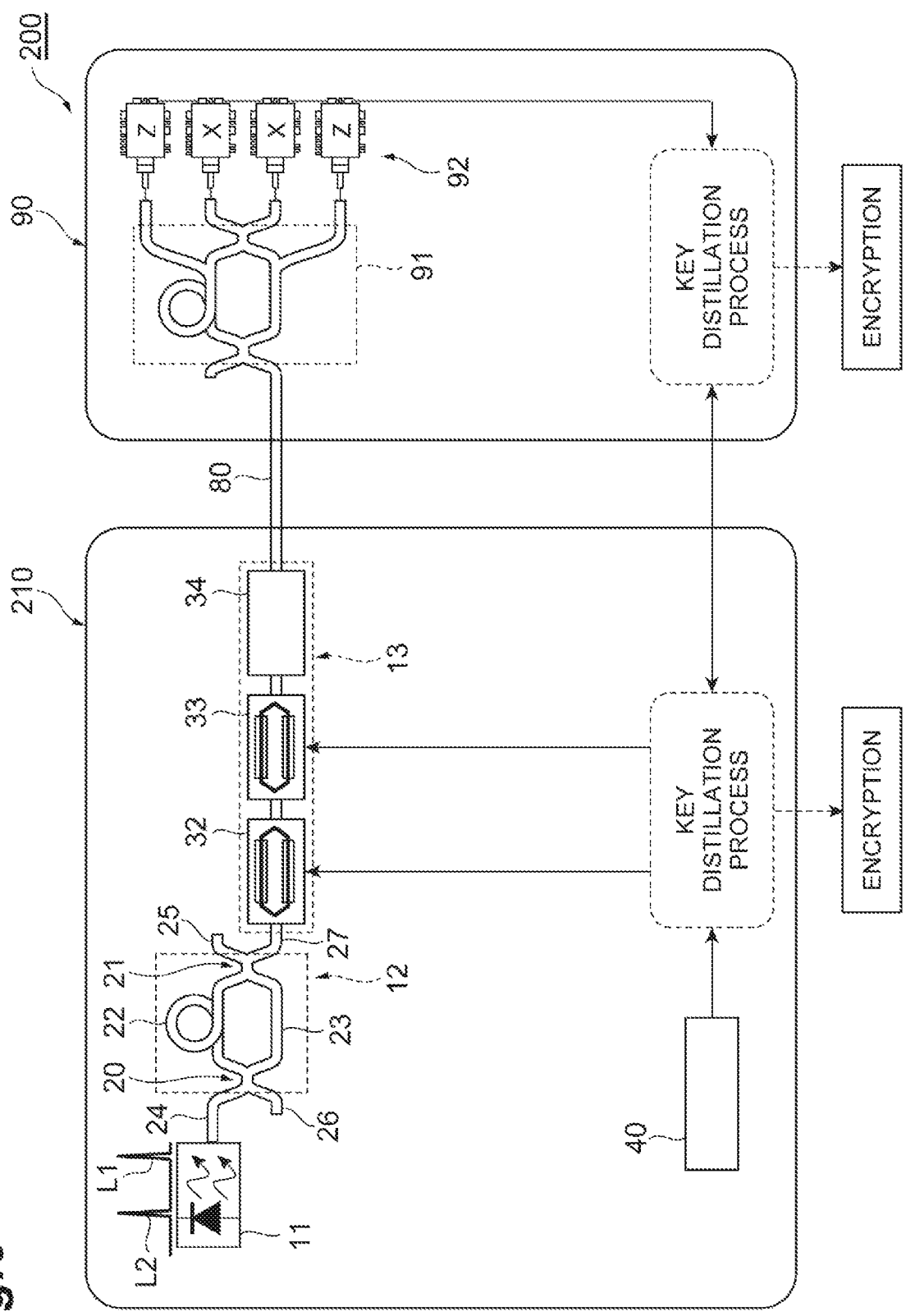
FIG. 6 is a schematic diagram illustrating a functional configuration of the entire quantum encryption communication system.

FIG. 6 is a schematic diagram illustrating a functional configuration of the premise quantum encryption communication system 200. As illustrated in FIG. 6, the quantum encryption communication system 200 includes: a quantum encryption transmitter 210; an optical transmission line 80 including optical fibers and the like; and a quantum encryption receiver 90. The quantum encryption communication system 200 is a system that shares information relating to an encryption key (hereinafter, referred to as "encryption key information") between the quantum encryption transmitter 210 and the quantum encryption receiver 90 without being wiretapped by a third party. In other words, according to the quantum encryption communication system 200, information (hereinafter, referred to as a "message") to be transmitted from the quantum encryption transmitter 210 to the quantum encryption receiver 90 can be securely transmitted information-theoretically.

The quantum encryption transmitter 210 generates a random number sequence and encrypts a message using an encryption key acquired on the basis of the generated random number sequence. In addition, the quantum encryption transmitter 210 causes photons to include encryption key information and outputs the photons to the optical transmission line 80. In addition, the encrypted message, for example, is transmitted from the quantum encryption transmitter 210 to the quantum encryption receiver 90 using an arbitrary communication means such as the Internet or the like. The optical transmission line 80 transmits photons from the quantum encryption transmitter 210 to the quantum encryption receiver 90. The quantum encryption receiver 90 acquires an encryption key from the encryption key information included in photons input from the optical transmission line 80 and decrypts the encrypted message using the encryption key.

The quantum encryption transmitter 210 includes a semiconductor laser device 11, an interferometer 12, a modulation unit 13, and a random number source 40. As long as the random number source 40 can generate a physical random number that cannot be predicted information-theoretically and, for example, can generate a random number sequence at a generation speed of several Gb/s or more, the random number source 40 is not limited to a specific configuration. In addition, the random number source 40 is disposed independently from the semiconductor laser device 11 and the interferometer 12.

The semiconductor laser device 11 causes pulse oscillation and repeatedly generates a pulsed laser beam having a disordered phase for each pulse. The semiconductor laser device 11, for example, repeatedly generates a pulsed laser beam at a clock frequency of a synchronization signal shared by the quantum encryption transmitter 210 and the quantum encryption receiver 90. In the drawing, pulsed laser beams L1 and L2 generated at different timings that are different by one clock are illustrated as an example. The semiconductor laser device 11 inputs the pulsed laser beams L1 and L2 to the interferometer 12.

Figure 7:
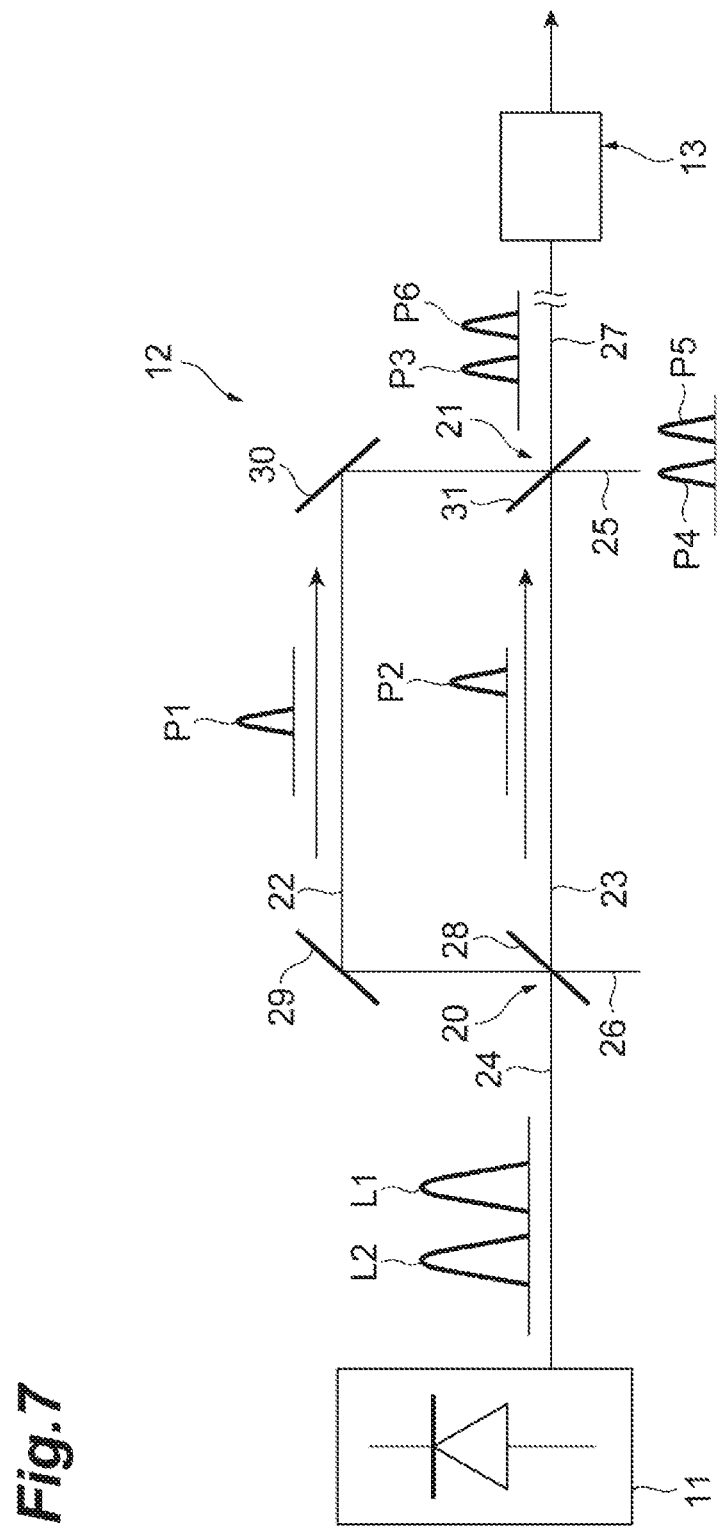
FIG. 7 is a diagram illustrating the configuration of an interferometer illustrated in FIG. 6.

FIG. 7 is a diagram illustrating the configuration of the interferometer 12 illustrated in FIG. 6. As illustrated in FIG. 7, the interferometer 12 is an asymmetric Mach-Zehnder interferometer. The interferometer 12 includes: an input terminal 20; an output terminal 21; a first transmission line 22 and a second transmission line 23 connecting the input terminal 20 and the output terminal 21; a first port 24 and a third port 26 connected to the input terminal 20 side; and a second port 25 and a fourth port 27 connected to the output terminal 21 side. Each port is used for input/output of the pulsed laser beams L and L2 in the interferometer 12. The semiconductor laser device 11 is connected to the first port 24. The semiconductor laser device 11 inputs the generated pulsed laser beams L1 and L2 to the interferometer 12 through the first port 24.

A first beam splitter 28 is disposed at the input terminal 20. For example, the pulsed laser beam L1 generated by the semiconductor laser device 11 is split into a reflected beam and a transmitted beam by the first beam splitter 28. A component of a pulsed laser beam, which is included in the pulsed laser beam L1, reflected by the first beam splitter 28 will be represented as a first pulse P1. In addition, a component of a pulsed laser beam, which is included in the pulsed laser beam L1, transmitted through the first beam splitter 28 will be represented as a second pulse P2. The first pulse P1 and the second pulse P2 form double pulses separated in time and space with coherence maintained.

The first transmission line 22 is a transmission line through which the first pulse P1 is transmitted from the input terminal 20 to the output terminal 21. Mirrors 29 and 30 are included in the middle of the first transmission line 22. On the other hand, the second transmission line 23 is a transmission line through which the second pulse P2 is transmitted from the input terminal 20 to the output terminal 21. The first transmission line 22 and the second transmission line 23 have mutually-different transmission line lengths. Here, the transmission line length of the first transmission line 22 is longer than that of the second transmission line 23.

A second beam splitter 31 is disposed at the output terminal 21. The first pulse P1 having passed through the first transmission line 22 is split into a reflected beam and a transmitted beam by the second beam splitter 31. A component of a pulsed laser beam, which is included in the first pulse P1, reflected by the second beam splitter 31 will be represented as a third pulse P3. In addition, a component of a pulsed laser beam, which is included in the first pulse P1, transmitted through the second beam splitter 31 will be represented as a fourth pulse P4. The third pulse P3 and the fourth pulse P4 form double pulses separated in time and space with coherence maintained.

The second pulse P2 that has passed through the second transmission line 23 is split into a reflected beam and a transmitted beam by the second beam splitter 31. A component of a pulsed laser beam, which is included in the second pulse P2, reflected by the second beam splitter 31 will be represented as a fifth pulse P5. In addition, a component of a pulsed laser beam, which is included in the second pulse P2, transmitted through the second beam splitter 31 will be represented as a sixth pulse P6. The fifth pulse P5 and the sixth pulse P6 form double pulses separated in time and space with coherence maintained.

In this way, the pulsed laser beam L1 formed of one pulse input to the first port 24 is output from the fourth port 27 as the third pulse P3 and the sixth pulse P6 that are double pulses split in time and space with coherence maintained.

As illustrated in FIG. 6, the modulation unit 13 is connected to the fourth port 27. The modulation unit 13 includes an intensity modulation unit 32, a state generating unit 33, and a damping unit (damper) 34. The modulation unit 13 generates a pulsed laser beam for transmission by randomly modulating light intensities (in other words, average photon numbers) and phases of pulsed laser beams forming double pulses. The modulation unit 13 outputs the generated pulsed laser beam for transmission to the optical transmission line 80. In addition, no component is connected to the second port 25 and the third port 26.

As the intensity modulation unit 32, a known modulator used for ordinary optical communication may be used. For example, the intensity modulation unit 32 may be a Mach-Zehnder type modulator using lithium niobate (LN:LiNbO$_3$) crystals. When the third pulse P3 and the sixth pulse P6 are input, the intensity modulation unit 32 modulates a light intensity such that it has a desired average photon number that is randomly selected on the basis of a random number generated by the random number source 40. In addition, the intensity modulation unit 32 modulates a light intensity such that it has the desired average photon number described above in consideration of the damping amount of the light intensity damped by the damping unit 34.

As the state generating unit 33, for example, a known phase modulator may be applied. When the third pulse P3 and the sixth pulse P6 are input, the state generating unit 33 modulates phases of the third pulse P3 and the sixth pulse P6 such that they form a quantum state that is randomly selected on the basis of a random number generated by the random number source 40.

Here, it is preferable to select a base for describing the quantum states of the third pulse P3 and the sixth pulse P6 as follows. First, out of the third pulse P3 and the sixth pulse P6, a quantum state of the sixth pulse P6 transmitted first will be represented as $|0\rangle$, and the quantum state of the third pulse P3 transmitted later will be represented as $|1\rangle$. In this case, the quantum state of the double pulses is represented by the following Equation (1).

[Math. 1]

$$\frac{1}{\sqrt{2}}(|0\rangle + |1\rangle) \qquad (1)$$

In quantum key distribution, in a case in which it is premised to use a Decoy BB84 protocol, a base X and a base Z may be employed as the base. At this time, four states that are necessary for the Decoy BB84 protocol are represented by the following Equations (2), (3), and (4).

[Math. 2]
$$\frac{1}{\sqrt{2}}(|0\rangle \pm |1\rangle) \qquad (2)$$

[Math. 3]
$$|0\rangle \qquad (3)$$

[Math. 4]
$$|1\rangle \qquad (4)$$

As above, the modulation unit 13 randomly modulates the quantum states of the pulsed laser beams and assigns a bit binarized as being "0" or "1." At this time, each bit is described using a randomly-selected base, which is either the base X or the base Z.

The semiconductor laser device 11 repeatedly generates a pulsed laser beam. For this reason, the modulation unit 13 generates a bit stream in which bits binarized as being "0" or "1" are aligned. This bit stream is a source of an encryption key.

The quantum encryption communication system 200 executes a key distillation process to be described below for an encryption key.

The quantum encryption transmitter 210 transmits a bit stream that is a source of the encryption key to the quantum encryption receiver 90. Due to a loss during transmission, only a part of the transmitted pulsed laser beam reaches the quantum encryption receiver 90. The quantum encryption receiver 90 includes a decoder 91 and a photon detecting unit 92. The decoder 91 distributes a pulsed laser beam configuring each bit of a bit stream that is a source of an encryption key to each port of the photon detecting unit 92 corresponding to the base X or the base Z on the basis of the received pulsed laser beam for transmission. As a result, each of bits binarized as being "0" or "1" is generated in the photon detecting unit 92. In other words, a part of the bit stream generated by the modulation unit 13 is reproduced by the quantum encryption receiver 90. Thereafter, the quantum encryption receiver 90 notifies the port (position) of the photon detecting unit 92 that has detected the pulsed laser beam to the quantum encryption transmitter 210. Then, the bit stream reproduced by the quantum encryption receiver 90 is set as a key.

Subsequently, the quantum encryption transmitter 210 executes base collation. In other words, the quantum encryption transmitter 210 collates a base (transmission base) used by the quantum encryption transmitter 210 with a base (reception base) used by the quantum encryption receiver 90. A bit stream formed of other bits acquired by excluding bits that are different between the transmission base and the reception base is set as a shift key.

Subsequently, the quantum encryption receiver 90 discloses a part of the shift key to be public to the quantum encryption transmitter 210. The quantum encryption transmitter 210 estimates an error ratio that is a ratio of erroneous bits received by the quantum encryption receiver 90 to bits transmitted by the quantum encryption transmitter 210 on the basis of the public shift key.

Subsequently, the quantum encryption transmitter 210 and the quantum encryption receiver 90 execute error correction. As the error correction, a technique similar to a method executed in general communication may be used.

Subsequently, the quantum encryption transmitter 210 and the quantum encryption receiver 90 execute confidentiality enhancement. First, the quantum encryption transmitter 210 and the quantum encryption receiver 90 estimate an upper limit value M of the number of bits (leaked information quantity) having a possibility of being wiretapped by a third party in the shift key of N bits on the basis of the estimated error ratio. Then, the quantum encryption transmitter 210 and the quantum encryption receiver 90 randomly discard M+s bits acquired by adding a constant s to the upper limit value M from the shift key of N bits and sets the remainder as a final key. As a result, the possibility of a wiretapper acquiring the final key can be decreased to be $2^{-s}$ or less.

Meanwhile, bits that are randomly discarded from the shift key are selected using a universal hash function. As the universal hash function, a matrix in which the value (0, 1) of each component is randomly selected on the basis of a random number generated by the random number source 40 may be used.

In addition, the leaked information quantity estimated in the confidentiality enhancement is different depending on a phase correlation between pulsed laser beams that are repeatedly generated by the semiconductor laser device 11. In a case in which it is assumed that there is a phase correlation, the leaked information quantity is estimated to have a larger value than that in a case in which it is assumed that there is no phase correlation.

The quantum encryption receiver 90 decrypts an encrypted message using the final key acquired as described above.

[Configuration of this embodiment] Next, the configurations of a random number sequence generation apparatus 1, a quantum encryption transmitter 10, and a quantum encryption communication system 100 according to this embodiment will be described.

Figure 1:
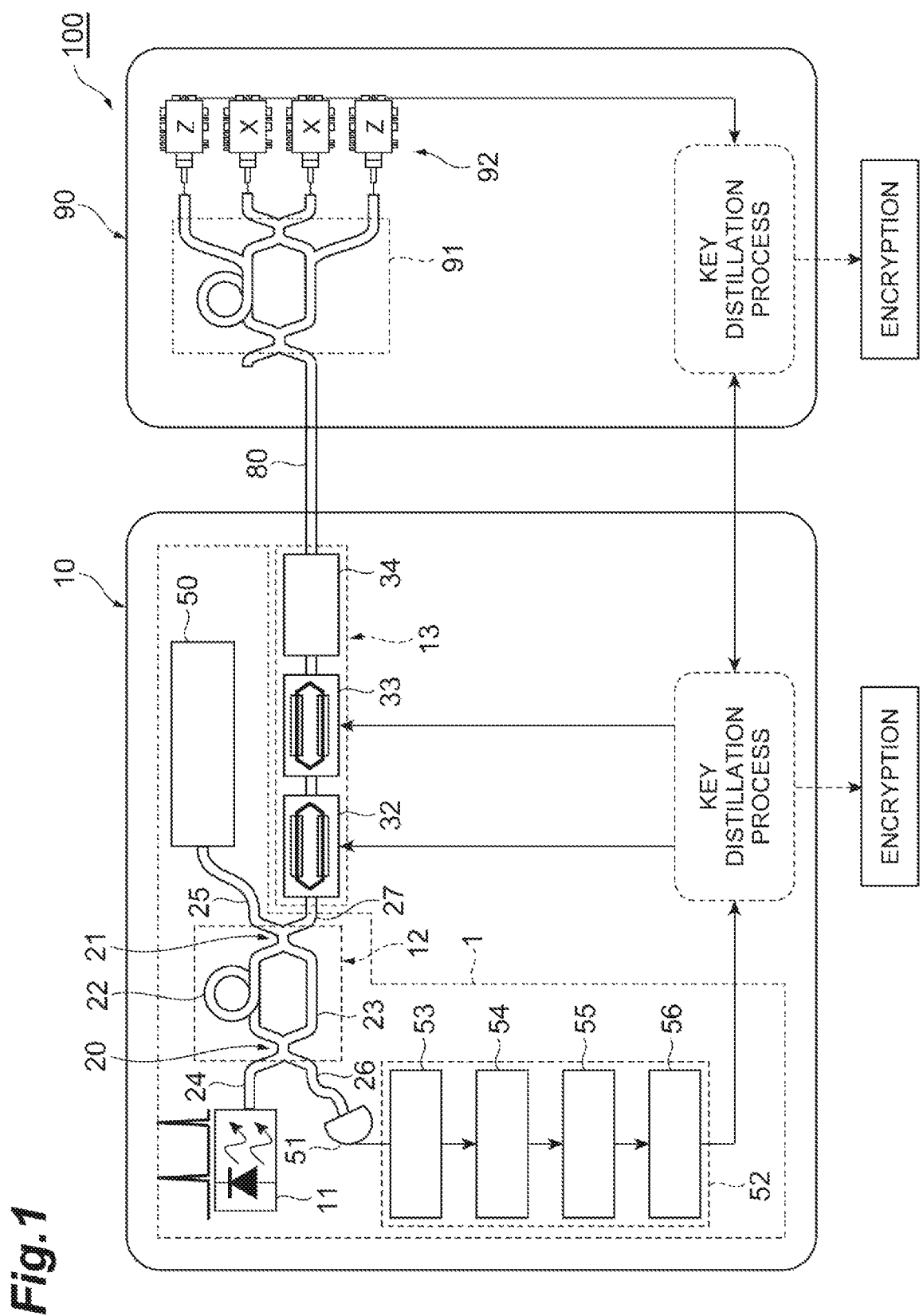
FIG. 1 is a schematic view illustrating a functional configuration of a quantum encryption communication system according to this embodiment.

FIG. 1 is a schematic view illustrating a functional configuration of the quantum encryption communication system 100 according to this embodiment. As illustrated in FIG. 1, the quantum encryption transmitter 10 of the quantum encryption communication system 100 is different from the quantum encryption transmitter 210 of the quantum encryption communication system 200 illustrated in FIG. 6 in that the random number source 40 is not included, and a Faraday mirror (light reflecting unit) 50, a photodiode 51, and a processing circuit 52 are included. In addition, the random number sequence generation apparatus 1 included in the quantum encryption transmitter 10 includes a semiconductor laser device 11, an interferometer 12, the Faraday mirror 50, the photodiode 51, and the processing circuit 52.

Figure 2:
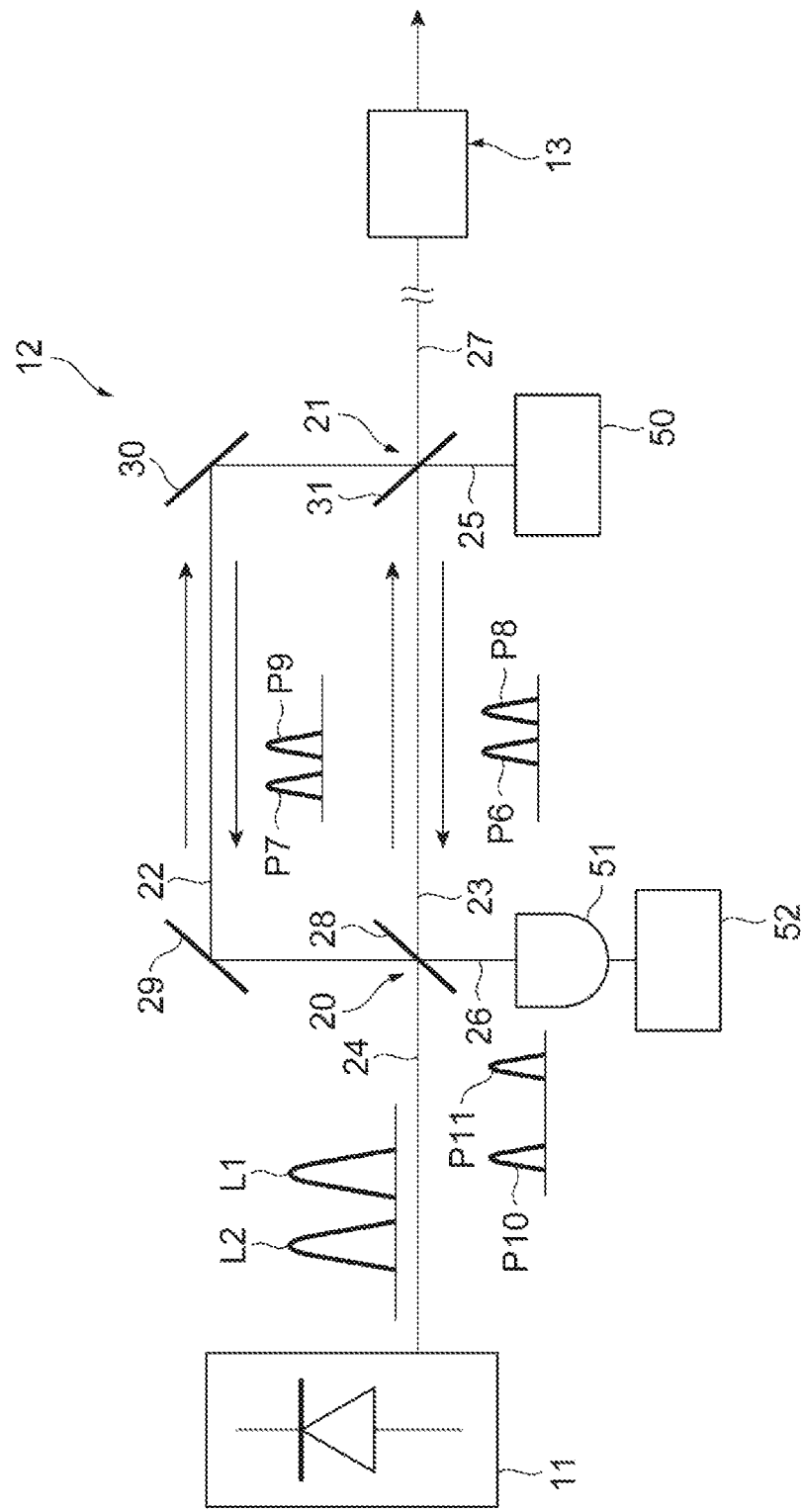
FIG. 2 is a diagram illustrating the configuration of an interferometer illustrated in FIG. 1.

FIG. 2 is a schematic diagram illustrating the configuration of the interferometer 12. As illustrated in FIG. 2, the Faraday mirror 50 is connected to a second port 25 of the interferometer 12. In addition, the photodiode 51 is connected to a third port 26.

In the quantum encryption communication system 100, the fourth pulse P4 and the fifth pulse P5 described above are output from the second port 25 to the Faraday mirror 50 and are reflected by the Faraday mirror 50. The fourth pulse P4 and the fifth pulse P5 reflected by the Faraday mirror 50 are input to the second port 25 again.

The fourth pulse P4 that is input to the second port 25 again is split into a reflected beam and a transmitted beam by a second beam splitter 31. A component of a pulsed laser beam, which is included in the fourth pulse P4, reflected by the second beam splitter 31 will be represented as a sixth pulse P6. In addition, a component of a pulsed laser beam, which is included in the fourth pulse P4, transmitted through the second beam splitter 31 will be represented as a seventh pulse P7. The sixth pulse P6 and the seventh pulse P7 form double pulses separated in time and space with coherence maintained.

In addition, the fifth pulse P5 that is input to the second port 25 again is split into a reflected beam and a transmitted beam by the second beam splitter 31. A component of a pulsed laser beam, which is included in the fifth pulse P5, reflected by the second beam splitter 31 will be represented as an eighth pulse P8. In addition, a component of a pulsed laser beam, which is included in the fifth pulse P5, transmitted through the second beam splitter 31 will be represented as a ninth pulse P9. The eighth pulse P8 and the ninth pulse P9 form double pulses separated in time and space with coherence maintained.

The seventh pulse P7 is transmitted through a first transmission line 22, reaches the first beam splitter 28, and is split into a transmitted beam and a reflected beam by the first beam splitter 28. A component of a pulsed laser beam, which is included in the seventh pulse P7, transmitted through the first beam splitter 28 will be represented as a tenth pulse P10. The tenth pulse P10 is output from the third port 26 to the photodiode 51.

The eighth pulse P8 is transmitted through a second transmission line 23, reaches the first beam splitter 28, and is split into a transmitted beam and a reflected beam by the first beam splitter 28. A component of a pulsed laser beam, which is included in the eighth pulse P8, reflected by the first beam splitter 28 will be represented as an eleventh pulse P11. The eleventh pulse P11 is output from the third port 26 to the photodiode 51.

The tenth pulse P10 and the eleventh pulse P11 form double pulses separated in time and space with coherence maintained. The tenth pulse P10 reaches the third port 26 after being delayed than the eleventh pulse P11. Here, a delay time of the tenth pulse P10 with respect to the eleventh pulse P11 is set in accordance with a difference between the transmission line lengths of the first transmission line 22 and the second transmission line 23.

As above, the behavior of the pulse until the pulsed laser beam L1 generated by the semiconductor laser device 11 is reflected by the Faraday mirror 50 and reaches the photodiode 51 has been described. Similarly, also in the pulsed laser beam L2 that is generated by the semiconductor laser device 11 after being delayed than the pulsed laser beam L1 by one clock, the pulse exhibits the behavior described above. Here, in the pulsed laser beam L2, a pulse corresponding to the tenth pulse P10 of the pulsed laser beam L1 (in other words, in a pulse split from the pulsed laser beam L2, a pulse that reaches the second port 25 from the first port 24 through the first transmission line 22, is reflected by the Faraday mirror 50, and then reaches the third port 26 through the first transmission line 22) will be represented as a twelfth pulse P12. In addition, in the pulsed laser beam L2, a pulse corresponding to the eleventh pulse P11 of the pulsed laser beam L1 (in other words, in a pulse split from the pulsed laser beam L2, a pulse that reaches the second port 25 from the first port 24 through the second transmission line 23, is reflected by the Faraday mirror 50, and then reaches the third port 26 through the second transmission line 23) will be represented as a thirteenth pulse P13.

Figure 3:
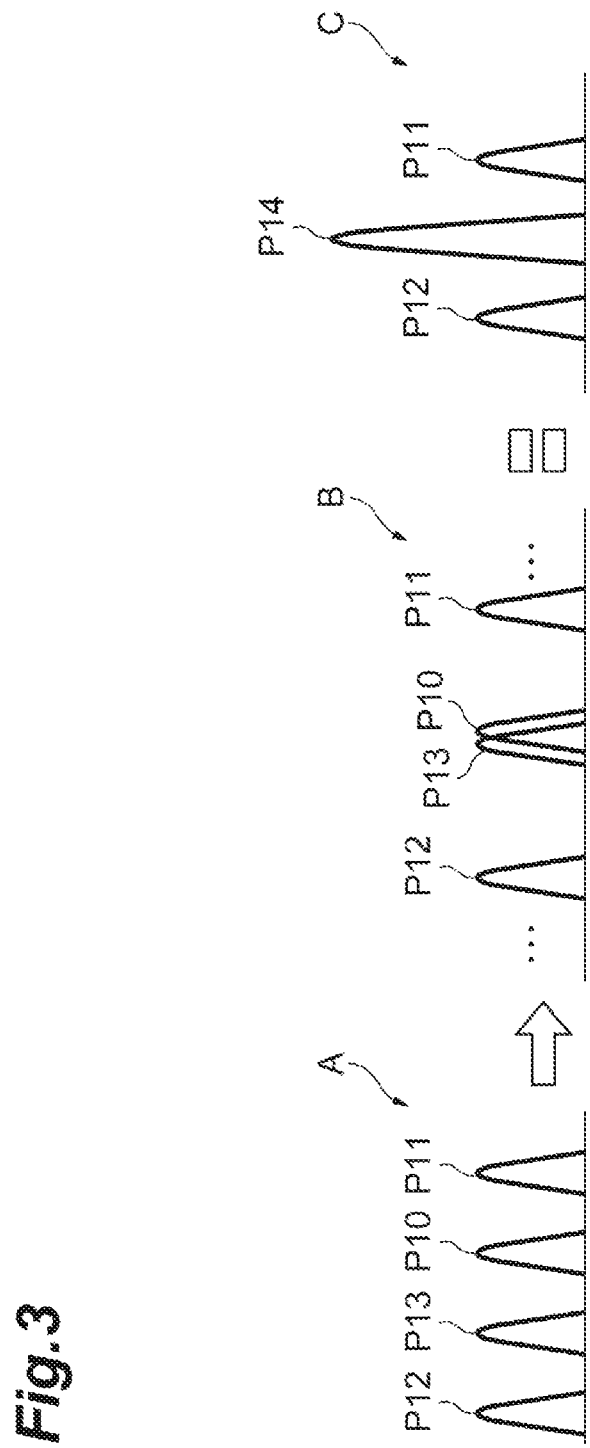
FIG. 3 is a diagram illustrating interference of a pulsed laser beam.

FIG. 3 is a diagram illustrating interference of a pulsed laser beam. A state A illustrated in FIG. 3 illustrates one example of timings at which each pulsed laser beam is output from the third port 26 to the photodiode 51. In FIG. 3, pulses other than a tenth pulse P10, an eleventh pulse P11, a twelfth pulse P12, and a thirteenth pulse P13 are not illustrated.

Here, by appropriately setting a difference between the transmission line lengths of the first transmission line 22 and the second transmission line 23, the tenth pulse P10, the eleventh pulse P11, the twelfth pulse P12, and the thirteenth pulse P13 are output from the third port 26 to the photodiode 51 at timings as illustrated in a state B illustrated in FIG. 3. In the state B, the tenth pulse P10 split from a pulsed laser beam L1 and the thirteenth pulse P13 split from the pulsed laser beam L2 are output from the third port 26 to the photodiode 51 almost at the same time. For this reason, as illustrated in a state C illustrated in FIG. 3, the tenth pulse P10 and the thirteenth pulse P13 interfere with each other to generate a fourteenth pulse P14 (interference light) when being input to the photodiode 51.

In accordance with input of the interference light, the photodiode 51 outputs an electrical signal to the processing circuit 52. As the photodiode 51, it is preferable to use a photodiode, particularly, having superior responsiveness.

Figure 4:
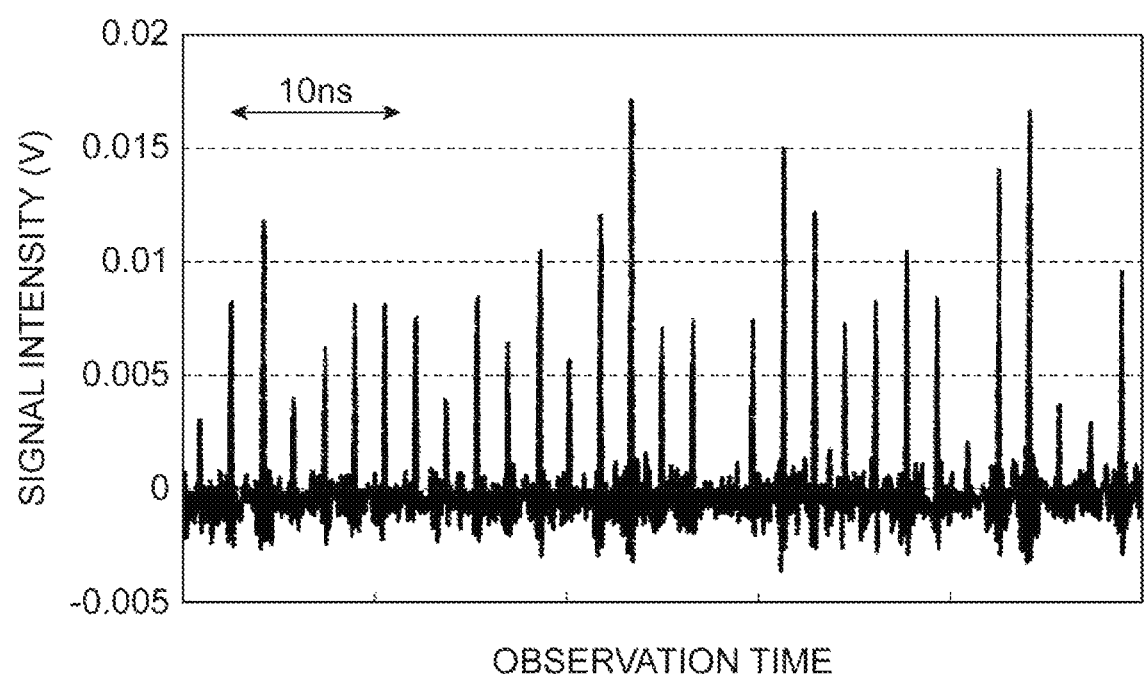
FIG. 4 is a diagram illustrating one example of an electrical signal output by a photodiode in accordance with input of interference light.

A pulsed laser beam generated by the semiconductor laser device 11 has a random phase for each pulse. For this reason, the light intensity of the fourteenth pulse P14 has a disordered value. FIG. 4 is a diagram illustrating one example of an electrical signal output by the photodiode 51 in accordance with input of interference light. As illustrated in FIG. 4, when the fourteenth pulse P14 is input to the photodiode 51, the photodiode 51 outputs an electrical signal having a disordered signal intensity in accordance with the light intensity of the fourteenth pulse P14.

The processing circuit 52 is a circuit that acquires a random number sequence by processing an electrical signal output from the photodiode 51. The processing circuit 52 includes an AD converter 53, a random number extracting unit 54, a randomness verification unit 55, and a random number sequence storing unit 56.

The AD converter 53 converts an electrical signal from an analog value to a digital value. The AD converter 53 stores a threshold that is set in advance. The AD converter 53 compares a signal intensity of a peak of an electrical signal with the threshold and outputs a binarized random number on the basis of a magnitude relationship therebetween. In addition, in a case in which a random number sequence of n bits is acquired from a peak of one electrical signal, thresholds $T_0, T_1, \ldots, T_u$ (here, $u=2^n-2$) are set in advance, and, when the signal intensity V of the peak of the electrical signal is $T_{i-1}$ or more and less than $T_i$, the value of i expressed in a binary system is the random number sequence of n bits. On the other hand, when the signal intensity V is T or more, the value of u expressed in a binary system is the random number sequence of n bits. In addition, when the signal intensity V is less than $T_0$, "0" is the value of the random number. The thresholds $T_0, T_1, \ldots, T_u$ may be set such that values of random numbers appear with an approximately equal probability, and, in such a case, the generation efficiency of random numbers can be improved in a case in which uniform random numbers are desired to be acquired.

The random number extracting unit 54 calculates a min-entropy $H_{min}$ in a random number sequence of m×n bits acquired from peaks of m electrical signals. Here, the min-entropy $H_{min}$ is a value represented as $H_{min}=-\log_2 P_{max}$ when a highest probability among probabilities P(I) at which I (here, I is a value of i expressed in a binary system) appears as a random number sequence is $P_{max}=\max P(I)$. The random number extracting unit 54 randomly takes out a random number sequence of $H_{min}$ bits from the random number sequence of m×n bits using a universal hash function and outputs the random number sequence. In addition, the random number extracting unit 54 outputs a magnitude ratio $R=H_{min}/mn$ of $H_{min}$ to the random number sequence.

The randomness verification unit 55 generates a random number sequence acquired by collecting a regulated quantity (for example, 1M bits) of the random number sequence acquired by the random number extracting unit 54 and, for example, executes verification of randomness by executing a plurality of tests such as "frequency verification in units of blocks." In the verification of the randomness, each test is executed for a plurality of random number sequences. Then, "1" (appropriateness) is output when all the random number sequences are appropriate for all the tests, and "0" (inappropriateness) is output otherwise. In addition, the randomness verification unit 55 outputs "1" (appropriateness) in a case in which the magnitude ratio R between Hi, and the random number sequence is higher than a magnitude ratio RI between the min-entropy $H_{min}$ corresponding to the degree of disorder required for each protocol and the random number sequence and outputs "0" (in appropriateness) in the other cases. The randomness verification unit 55 outputs a random number sequence conforming to verification of randomness to the random number sequence storing unit 56.

The random number sequence storing unit 56 stores the random number sequence input from the randomness verification unit 55. Then, when the random number sequence is necessary in each process in the quantum key distribution, the random number sequence storing unit 56 outputs the stored random number sequence. For example, the random number sequence storing unit 56 outputs the random number sequence for selecting a light intensity using the intensity modulation unit 32, selecting the state of an optical pulse using the state generating unit 33, selecting bits to be discarded from a shift key in the confidentiality enhancement, and the like.

As described above, according to the random number sequence generation apparatus 1 of this embodiment, the pulsed laser beams L1 and L2 are transmitted from the first port 24 to the first transmission line 22 or the second transmission line 23, reach the second port 25, are reflected by the Faraday mirror 50, and then are transmitted from the second port 25 to the first transmission line 22 or the second transmission line 23 to reach the third port 26. The first transmission line 22 and the second transmission line 23 have mutually-different transmission line lengths. For this reason, when the pulsed laser beams L1 and L2 are transmitted from the first port 24 to the second port 25 of the interferometer 12 and are transmitted from the second port 25 to the third port 26, one pulse is split into two pulses (double pulses) with coherence maintained. Out of two pulses forming the double pulses, a pulse transmitted through the first transmission line 22 having a longer transmission line length is delayed in reaching a port of a destination than a pulse transmitted through the second transmission line 23. For this reason, by appropriately setting a difference between the transmission line lengths of the first transmission line 22 and the second transmission line 23, pulses split from two pulsed laser beams L and L2 generated at mutually-different timings by the semiconductor laser device 11 reaches the third port 26 at almost the same time and interfere with each other at the third port 26 to generate interference light. Here, since the pulsed laser beams L and L2 have a disordered phase for each pulse, the light intensity of an interference peak of the interference light has a disordered value. When this interference light is input to the photodiode 51, the photodiode 51 outputs an electrical signal having a disordered signal intensity of a peak corresponding to the interference peak. When this electrical signal is input to the AD converter 53, the AD converter 53 outputs a binarized random number sequence on the basis of a magnitude relationship between the signal intensity of the peak of the electrical signal and the threshold set in advance. Accordingly, by employing a simple configuration, a random number sequence that is secured information-theoretically can be generated at a high speed.

In addition, the random number sequence generation apparatus 1 further includes the random number sequence storing unit 56 that stores the random number sequence generated by the AD converter 53. For this reason, when the random number sequence is necessary, the random number sequence can be immediately output.

In addition, the random number sequence generation apparatus 1 further includes the randomness verification unit 55 that executes verification of randomness for the random number sequence generated by the AD converter 53 and outputs a random number sequence conforming to verification to the random number sequence storing unit 56. For this reason, it can be assured that there is no phase correlation between the pulsed laser beams L1 and L2 generated by the semiconductor laser device 11.

Figure 5:
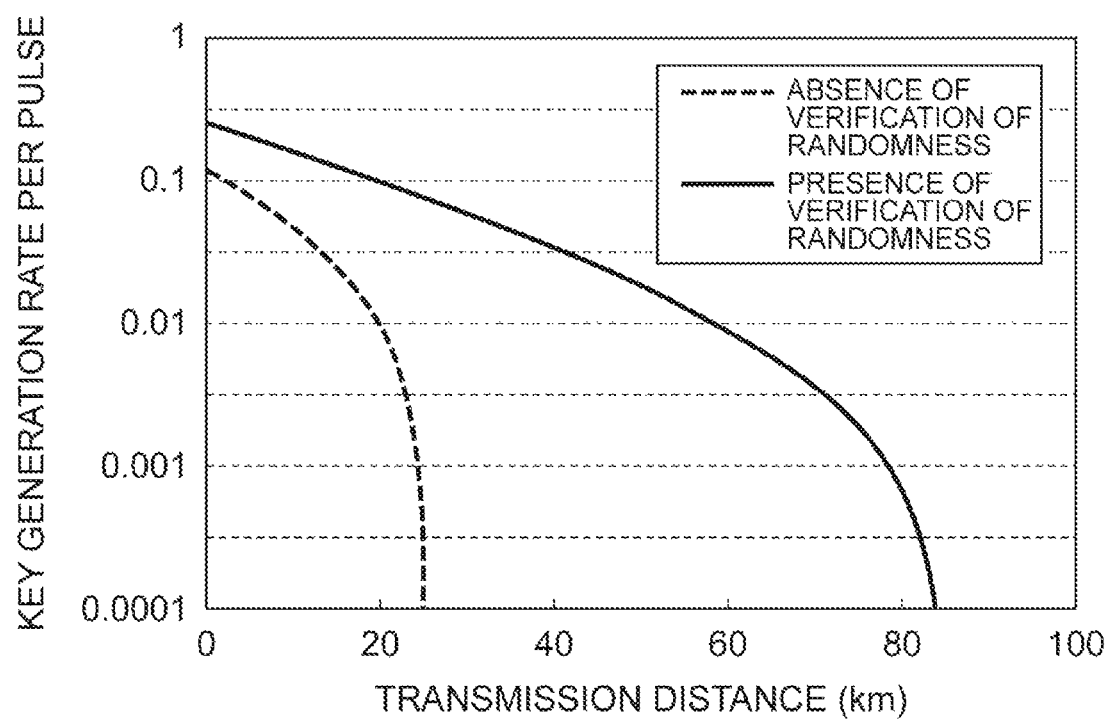
FIG. 5 is a graph illustrating a relation between a transmission distance of encryption key information and an encryption key generation rate according to presence/absence of verification of randomness.

FIG. 5 is a graph illustrating a relation between a transmission distance of encryption key information and an encryption key generation rate according to presence/absence of verification of randomness. In FIG. 5, the horizontal axis represents a transmission distance of encryption key information, and the vertical axis represents the number of bits (a key generation rate per pulse) that can be used for generation of a security-ensured encryption key in a case in which one pulsed laser beam is transmitted from the quantum encryption transmitter 10 to the quantum encryption receiver 90. FIG. 5 illustrates a relation between a transmission distance of encryption key information and an encryption key generation rate per pulse for each of a random number sequence of which the randomness is verified and a random number sequence of which the randomness is not verified. Here, the "random number sequence of which the randomness is verified" represents a random number sequence, for which verification of the randomness has been executed by the randomness verification unit 55, conforming to the verification. On the other hand, the "random number sequence of which the randomness is not verified" represents a random number sequence for which verification of the randomness has not been executed by the randomness verification unit 55. In quantum key distribution, when the transmission distance becomes long, the light intensity in the transmission line attenuates, and accordingly, the ratio of photons detected by the quantum encryption receiver 90 decreases. In addition, when the transmission distance becomes long, the influence of noise in the transmission line increases, and accordingly, an error ratio increases. Accordingly, a rate at which an encryption key per pulse is generated decreases in accordance with an increase in the transmission distance, whereby there is a limit on the transmission distance.

Here, in the random number sequence generation apparatus 1, in a case in which there is no phase correlation between pulsed laser beams that are repeatedly generated by the semiconductor laser device 11, the light intensity of the interference peak of the interference light that is repeatedly generated by the photodiode 51 has a disordered value. On the other hand, in a case in which there is a phase correlation, the disorder disappears. As above, by verifying the randomness of an acquired random number sequence, the presence/absence of the phase correlation between pulsed laser beams is verified. In a case in which the absence of the phase correlation is ensured, a leaked information quantity with respect to the error ratio can be estimated as being small. Accordingly, the transmission distance can be further increased.

In addition, according to the quantum encryption transmitter 10 of this embodiment, the random number sequence generation apparatus 1 is included, the interferometer 12 is connected to the output terminal 21 side, the fourth port 27 outputting a pulsed laser beam that is input to the first port 24 and passes through the first transmission line 22 or the second transmission line 23 is further included, and the modulation unit 13 that modulates a light intensity and a phase of the pulsed laser beam output from the fourth port 27 on the basis of the random number sequence stored in the random number sequence storing unit 56 is included. For this reason, the semiconductor laser device 11 and the interferometer 12 included in the quantum encryption transmitter 10 are used also as the semiconductor laser device 11 and the interferometer 12 of the random number sequence generation apparatus 1, and accordingly, the configuration can be simplified.

In addition, according to the quantum encryption communication system 100 of this embodiment, the quantum encryption transmitter 10 is included, and the quantum encryption receiver 90 is included which executes quantum communication of the pulsed laser beam, of which the light intensity and the phase are modulated by the modulation unit 13, with the quantum encryption transmitter 10. For this reason, the semiconductor laser device 11 and the interferometer 12 included in the quantum encryption transmitter 10 are used also as the semiconductor laser device 11 and the interferometer 12 of the random number sequence generation apparatus 1, and accordingly, the configuration can be simplified.

In addition, the present invention is not limited to the embodiment described above. For example, in the embodiment described above, the quantum encryption communication system 100 includes the optical transmission line 80 that includes optical fibers and the like. For this reason, the quantum encryption transmitter 10 and the quantum encryption receiver 90 transmit photons having encryption key information through the optical fibers. However, the optical transmission line 80 may not include the optical fibers. In such a case, the quantum encryption transmitter 10 and the quantum encryption receiver 90, for example, may transmit photons having encryption key information through a space.

In addition, in the embodiment described above, although the random number sequence generation apparatus 1 includes the processing circuit 52, the random number sequence generation apparatus 1 may include at least the AD converter 53 included in the processing circuit 52.

In addition, in the embodiment described above, although the interferometer 12 is the asymmetric Mach-Zehnder interferometer, the interferometer 12, for example, may be an interferometer of a different type such as an asymmetric Michelson interferometer or the like. In a case in which the asymmetric Michelson interferometer is used as the interferometer 12, an optical component such as a beam splitter or the like used for reflecting a part of the output of the interferometer 12 needs to be added.

In addition, in the embodiment described above, although the Faraday mirror 50 is connected to the second port 25, a general mirror may be connected to the second port 25.

Furthermore, in the embodiment described above, the modulation unit 13 randomly modulates the light intensity and the phase of pulsed laser beams forming double pulses. However, the modulation unit 13 may modulate an amplitude ratio and a phase difference between the double pulses (in other words, the states of the double pulses) without being limited to the modulation of the phase of each pulsed laser beam. More specifically, the state generating unit 33 of the modulation unit 13 may modulate an amplitude ratio and a phase difference between the double pulses. In addition, in such a case, the state generating unit 33 may use a combination of a known phase modulator and a known intensity modulator or a Mach-Zehnder type modulator of a two-electrode type using lithium niobate crystals. Particularly, in the state of the Decoy BB84 protocol, the modulation unit 13 modulates an amplitude ratio and a phase difference between double pulses.

In addition, in the embodiment described above, in the confidentiality enhancement, in selecting bits that are randomly discarded from the shift key, a universal hash function using a matrix of which the value (0, 1) of each component is randomly selected on the basis of a random number generated by the random number source 40 is used. However, in selecting bits that are randomly discarded from the shift key, a plurality of universal hash functions may be stored in the quantum encryption transmitter 10 and the quantum encryption receiver 90 in advance, and selection of one of the universal hash functions to be applied may be executed on the basis of a random number generated by the random number source 40.

In addition, in the embodiment described above, although the base X and the base Z are employed as the bases of the quantum states of double pulses, the base X and a base Y may be employed as the bases of the quantum states of the double pulses. In such a case, four states required for the Decoy BB84 protocol are represented by the following Equations (5) and (6).

[Math. 5]

$$\frac{1}{\sqrt{2}}(|0\rangle \pm |1\rangle) \tag{5}$$

[Math. 6]

$$\frac{1}{\sqrt{2}}(|0\rangle \pm i|1\rangle) \tag{6}$$

Here, the random number sequence generation apparatus may further include a random number sequence storing unit that stores a random number sequence generated by the AD converter. In such a case, when the random number sequence is necessary, the random number sequence can be immediately output.

In addition, the random number sequence generation apparatus may further include a randomness verification unit that executes verification of randomness for a random number sequence generated by the AD converter and outputs a random number sequence conforming to the verification to the random number sequence storing unit. In such a case, it can be assured that there is no phase relationship between pulsed laser beams generated by the semiconductor laser device.

REFERENCE SIGNS LIST

1 Random number sequence generation apparatus
10 Quantum encryption transmitter

11 Semiconductor laser device
12 Interferometer
13 Modulation unit
20 Input terminal
21 Output terminal
22 First transmission line
23 Second transmission line
24 First port
25 Second port
26 Third port
27 Fourth port
50 Faraday mirror (light reflecting unit)
51 Photodiode
53 AD converter
55 Randomness verification unit
56 Random number sequence storing unit
90 Quantum encryption receiver
100 Quantum encryption communication system
L1, L2 Pulsed laser beam

The invention claimed is:

1. A random number sequence generation apparatus comprising:
    a semiconductor laser device repeatedly generating a pulsed laser beam having a disordered phase for each pulse through pulse oscillation;
    an interferometer including a first transmission line and a second transmission line that have mutually-different transmission line lengths, a first port connected to an input terminal side of the first transmission line and the second transmission line and to which the pulsed laser beam is input, a second port that is connected to an output terminal side of the first transmission line and the second transmission line and outputs the pulsed laser beam that is input to the first port and passes through the first transmission line or the second transmission line, and a third port that is connected to the input terminal side;
    a Faraday mirror connected to the second port and inputting the pulsed laser beam output from the second port to the second port again by reflecting the pulsed laser beam;
    a photodiode connected to the third port, to which interference light of the pulsed laser beam that is input to the second port by the Faraday mirror and passes through the first transmission line or the second transmission line is input, and outputting an electrical signal in accordance with the input of the interference light; and
    a processing circuit,
    wherein the processing circuit is configured to generates a random number sequence on the basis of a magnitude relationship between a signal intensity of the electrical signal and a threshold set in advance.

2. The random number sequence generation apparatus according to claim 1, wherein the processing circuit is configured to store the random number sequence.

3. The random number sequence generation apparatus according to claim 2, wherein the processing circuit is configured to execute verification of randomness for the random number sequence and store the random number sequence conforming to the verification.

4. A quantum encryption transmitter comprising the random number sequence generation apparatus according to claim 2,
    wherein the interferometer further includes a fourth port that is connected to the output terminal side and outputs the pulsed laser beam that is input to the first port and passes through the first transmission line or the second transmission line,
    the quantum encryption transmitter further comprising a modulator configured to modulate a light intensity and a phase of the pulsed laser beam output from the fourth port on the basis of the random number sequence stored in the processing circuit.

5. A quantum encryption communication system comprising:
    the quantum encryption transmitter according to claim 4; and
    a quantum encryption receiver configured to execute quantum communication of the pulsed laser beam of which the light intensity and the phase are modulated by the modulator with the quantum encryption transmitter.

6. A quantum encryption transmitter comprising the random number sequence generation apparatus according to claim 3,
    wherein the interferometer further includes a fourth port that is connected to the output terminal side and outputs the pulsed laser beam that is input to the first port and passes through the first transmission line or the second transmission line,
    the quantum encryption transmitter further comprising a modulator configured to modulate a light intensity and a phase of the pulsed laser beam output from the fourth port on the basis of the random number sequence stored in the processing circuit.

7. A quantum encryption communication system comprising:
    the quantum encryption transmitter according to claim 6; and
    a quantum encryption receiver configured to execute quantum communication of the pulsed laser beam of which the light intensity and the phase are modulated by the modulator with the quantum encryption transmitter.

8. The random number sequence generation apparatus according to claim 1, wherein the interference light input to the photodiode is input directly from the input terminal side of the interferometer.

* * * * *